March 27, 1956 W. G. BOEHM 2,739,691
TRANSFER MECHANISM FOR RIGHT ANGLE CONVEYOR LINES
Filed April 6, 1950 5 Sheets-Sheet 1
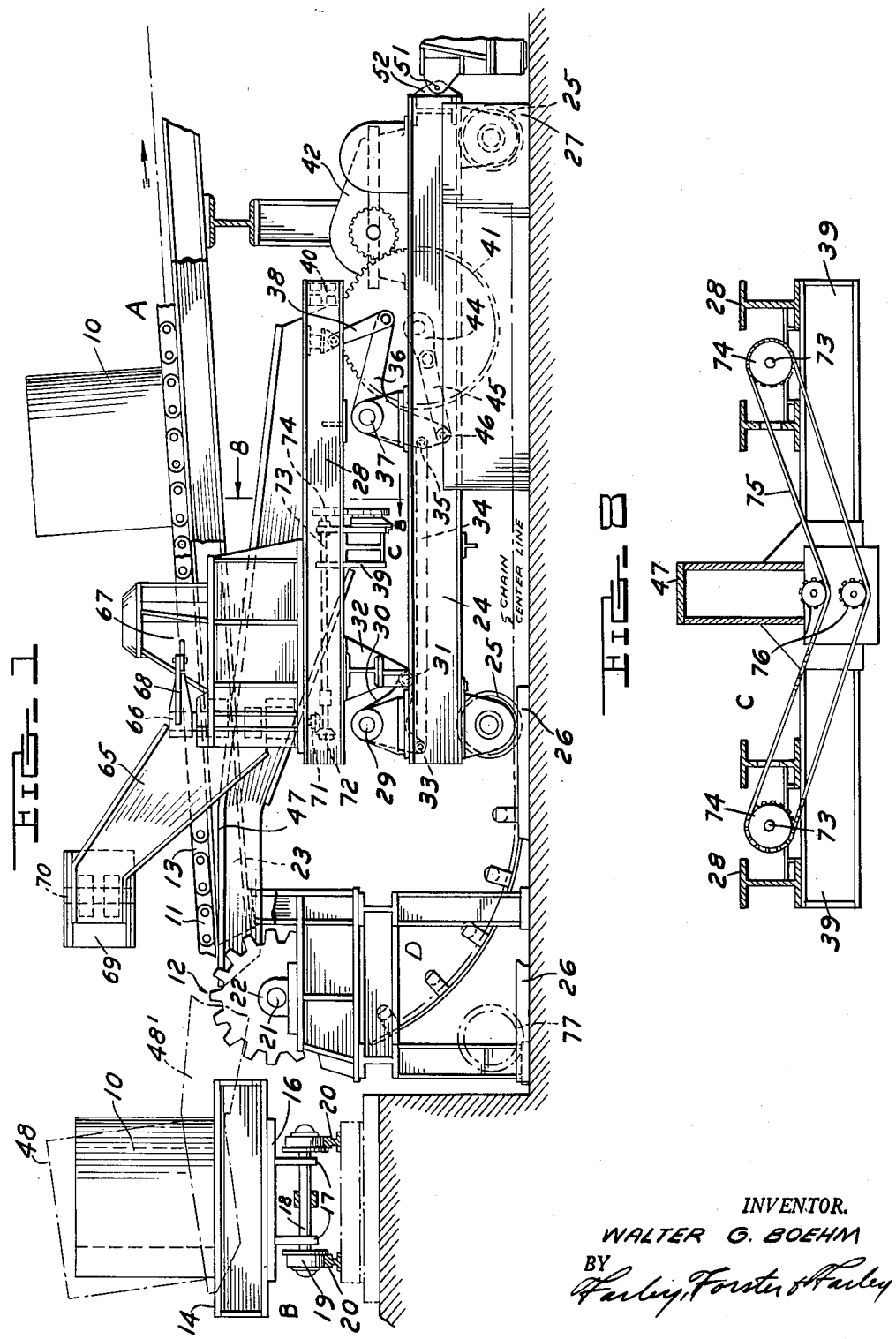
INVENTOR.
WALTER G. BOEHM
BY
ATTORNEYS

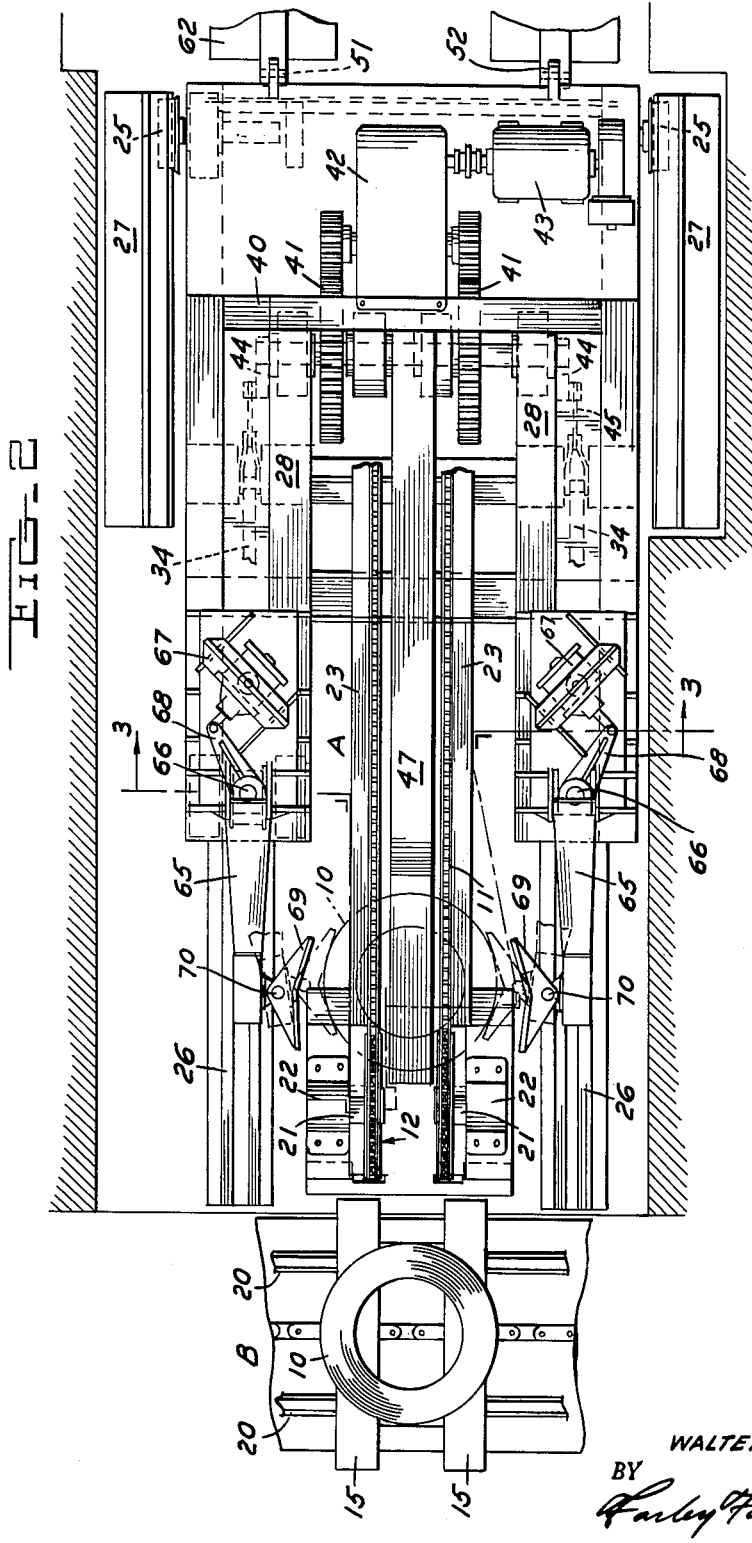

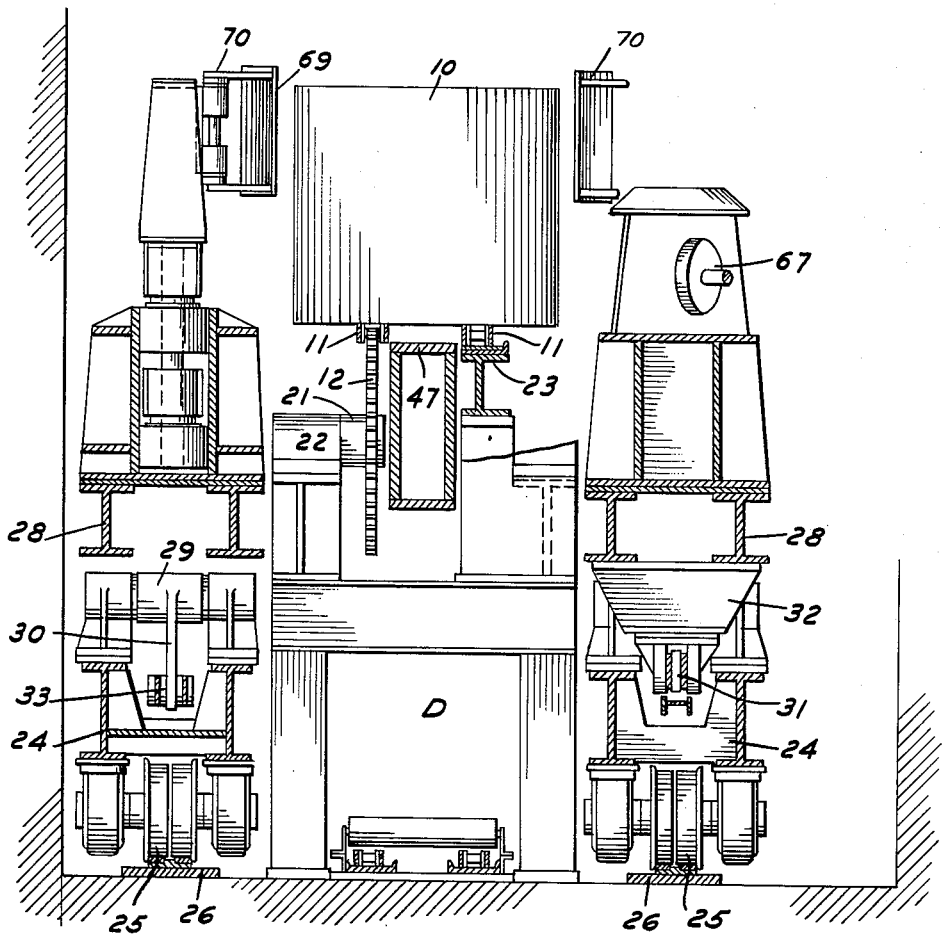

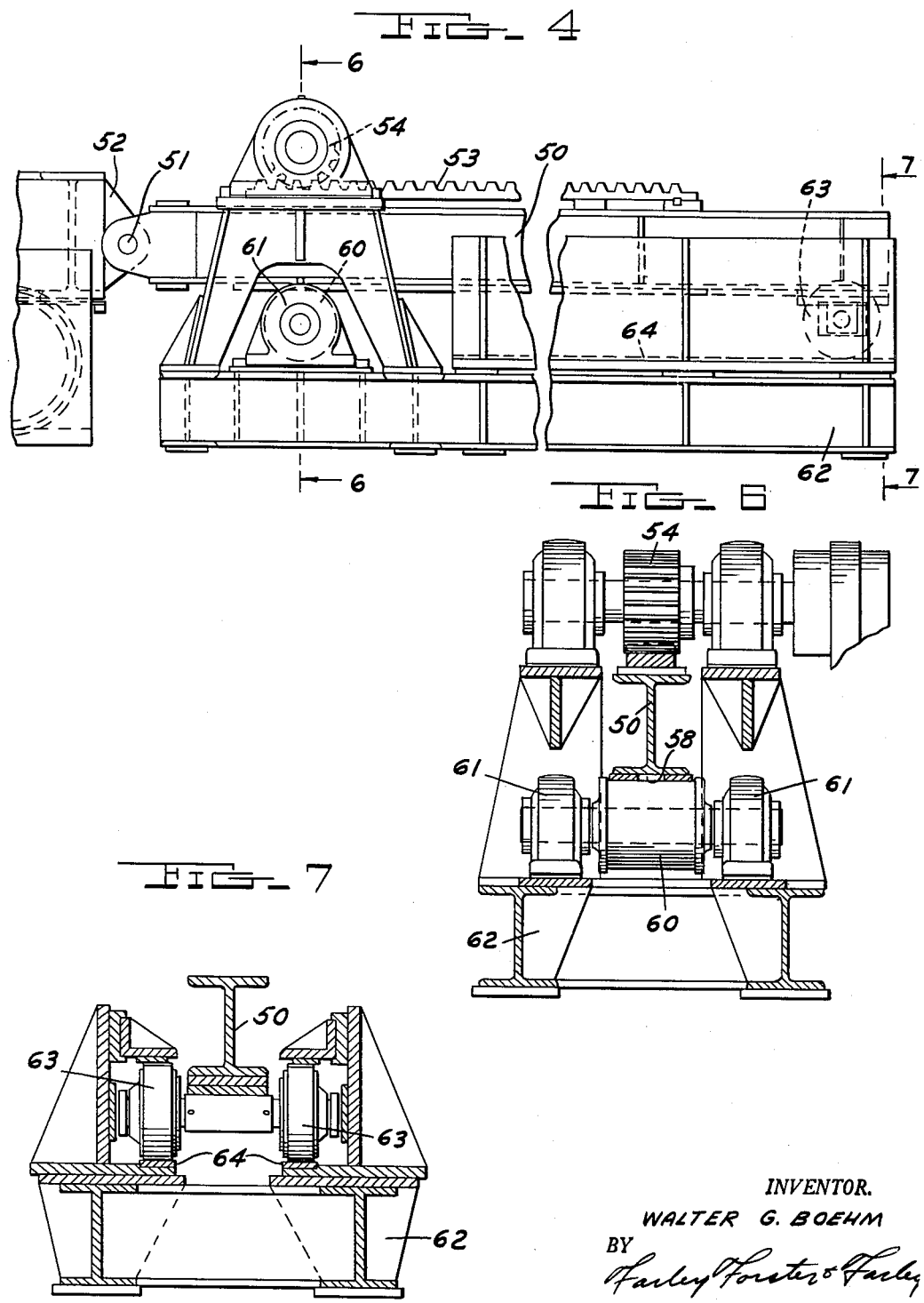

March 27, 1956 — W. G. BOEHM — 2,739,691
TRANSFER MECHANISM FOR RIGHT ANGLE CONVEYOR LINES
Filed April 6, 1950 — 5 Sheets-Sheet 5
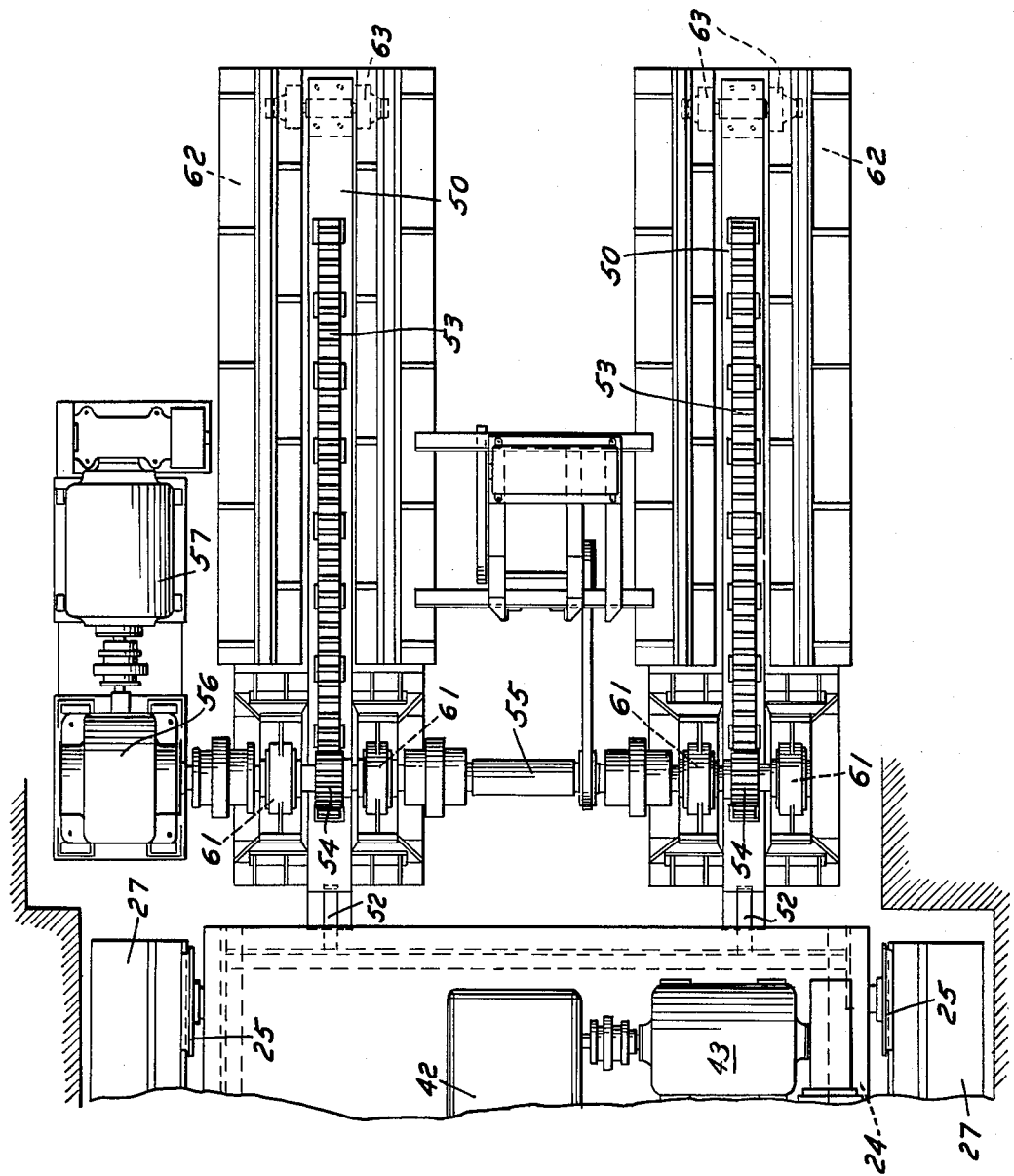
INVENTOR.
WALTER G. BOEHM
ATTORNEYS

United States Patent Office 2,739,691
Patented Mar. 27, 1956

2,739,691

TRANSFER MECHANISM FOR RIGHT ANGLE CONVEYOR LINES

Walter G. Boehm, Detroit, Mich., assignor to Palmer-Bee Company, Detroit, Mich., a corporation of Michigan Application April 6, 1950, Serial No. 154,355

12 Claims. (Cl. 198—20)

This invention relates to a transfer mechanism for moving loads from one conveyor to another and more particularly to a mechanism adapted to transfer individual rigid loads between conveyors running at right angles to each other at different levels and in planes bearing an angular rather than parallel relationship with each other.

In my co-pending application, Serial No. 136,699, and now Patent No. 2,678,715, I have disclosed a transfer mechanism adapted to transfer similar loads between two double-strand chain conveyors running in a right angle T relationship and in parallel planes.

In the present disclosure, one of the conveyors employs chain driven trucks on which loads are carried, while the other conveyor is of the double-strand chain type. Each truck is provided with two spaced cross beams, across which a rigid load is supported and which may be stopped in approximate alignment with the load chains of the other conveyor. The truck conveyor extends past the end of the double-strand chain conveyor and both conveyors are adapted to stop during the period of load transfer therebetween. Transfers of this type are frequently employed, for example, in steel mill operations. While various types of transfer mechanism have been developed to meet such transfer requirement, many of such prior mechanisms were attended by a number of disadvantages, such, for example, as improper transfer and delivery engagement causing damage to the edges of the coil, or shock impacts causing unwrapping of the rolls. Furthermore, none that I am aware of has been capable of flush surface nonsliding transfer engagement and delivery between conveyors traveling in planes inclined to each other.

It is an object of the present invention to provide a transfer mechanism adapted to move loads to or from a conveyor which travels in a plane inclined to the horizontal floor level.

Another object is to provide a transfer mechanism adapted to move loads between right angle conveyors traveling in planes inclined to each other.

Another object is to provide a transfer mechanism adapted to move loads between truck and double-strand chain types of conveyors.

Another object is to provide a transfer wherein relatively high loads may be supported against tipping during the transfer operation.

Another object is to employ a transfer having a single transfer arm adapted to extend between the cross beams of the truck conveyors, as well as between the double strands of the chain conveyor.

Another object is to provide a transfer mechanism capable of flush surface nonsliding transfer engagement and delivery.

These and other objects will be more apparent from the following detailed description of a particular embodiment of my invention, as well as from an examination of the drawings forming a part hereof, wherein Fig. 1 is a side elevation of the transfer mechanism;

Fig. 2 is a plan view of such transfer mechanism;

Fig. 3 is a sectional view along the line 3—3 of Fig. 2;

Fig. 4 is an extension of the side elevation shown in Fig. 1 showing the actuating mechanism for imparting longitudinal horizontal movement to the transfer mechanism;

Fig. 5 is a plan view of actuating mechanism shown in Fig. 4;

Fig. 6 is a partial section taken along the line 6—6 of Fig. 4;

Fig. 7 is a partial section taken along the line 7—7 of Fig. 4; and

Fig. 8 is a section taken along the line 8—8 of Fig. 1.

Referring to Fig. 1, it will be seen that a double-strand chain conveyor A travels at right angles away from a wheeled truck conveyor B and that a transfer mechanism, generally indicated as C, is provided to transfer loads 10 from the conveyor B to the conveyor A. Conveyor A is provided with a pair of drag chains 11 which pass around a pair of tail sprockets 12 positioned closely adjacent to the conveyor B. The load supporting surface 13 of the conveyor A travels at an incline to the horizontal, whereas the load supporting surface 14 of the conveyor B is horizontal.

It will be seen that in an embodiment such as that illustrated, where the loads consist of coils of sheet metal the edges of which are subject to being damaged in a transfer operation, it becomes desirable, if not necessary, to a successful transfer operation that any relative sliding of conveyor or transfer members against the surface of the coil be avoided and, in addition, that any edge contact, as distinguished from surface contact, during pickup or delivery of the load be avoided. Due to the relative inclination of the load supporting surfaces of conveyor B and conveyor A, it thus becomes necessary not only to accomplish vertical and lateral movement of the load during transfer but also a tilting of the axis of the load by the amount of such relative inclination.

The trucks of conveyor B, as may be seen in Figs. 1 and 2, are provided with a pair of spaced cross beams 15 which are mounted on top of a plate 16 in turn supported by vertical members 17 on a pair of axles 18 having wheels 19 adapted to run on conveyor track members 20. As seen in Fig. 2, the tail sprockets 12 of conveyor A have stub shafts 21 adapted to rotate in laterally spaced journals 22. The transfer mechanism C is provided with a load beam 23 which is of suitable width to pass between the cross beams 15 of the conveyor B as well as the sprocket axles 21 and conveyor chains 11 of the conveyor A.

The load beam 23 and certain intermediate structure, hereinafter described, is carried on movable transfer car 24 supported on four wheels 25 which engage floor tracks 26 and 27 extending in the direction of conveyor A. This car 24 and the intermediate raisable platform 28 mounted thereon are open at the center in order to permit them to extend on either side of the central supporting structure D for the tail sprockets 12 when the platform 24 is moved to its pickup position.

The two spaced portions of the car 24 at its forward end serve to support a pair of journals 29 for bell crank members 30 which are pivotally connected at 31 to depending members 32 on the separated sides of the intermediate platform 28, such bell crank members 30 also being pivotally connected at 33 to actuating rods 34 which extend backwardly to pivotal connections at 35 with rear bell crank members 36 journaled at 37 on a central portion of the car 24. The bell crank members 36 are adapted through actuating arms 38 to raise the rear end of the intermediate platform 28, while the rods 34 and forward bell crank members 30 simultaneously raise the forward end of such platform. The centrally located load beam 23 is rigidly secured to cross beams 39 and 40 and accordingly forms an integral part of the intermediate platform 28 but, unlike the laterally spaced portions of the patform, is adapted to pass between the conveyor chains 11 and sprockets 12 and over the supporting structure D when moved to a pickup position.

Laterally spaced rotary gears 41 driven by a gear reducer 42 and an electric motor 43 mounted at the rear end of the car 24, drive crank arms 44 and connecting rods 45 pivotally connected at 46 to the bell crank members 36, thereby providing a reciprocating drive for such bell crank members through a predetermined arc of travel.

Unequal arms on the bell crank members 36 and 30, as well as the operation of the intermediate link 38 used only in connection with rear bell crank members 36, serve to give the forward and rear ends of the intermediate platform 28 different relative values of vertical travel which enable the load engaging surface 47 of the load beam 23 to present a horizontal surface at one position of its vertical travel and an inclined surface corresponding to the angle of inclination of the conveyor A at another position of its vertical travel. Thus, by coordinating the geometry of the respective bell crank members 30 and 36 and the associated actuating connections with the height of the horizontal load engaging surfaces of the conveyor B and the height of the conveyor track A at the point of delivery, the load beam 23 is adapted, when the platform 24 is in its forward load engaging position, to be raised by bell crank members 30 and 36 into horizontal surface engagement with a load 10 carried on the cross beams 15 of the conveyor B, the load engaging surface 47 of the load beam 23 reaching a horizontal position appropriate for surface engagement of the lower end of the coil metal load at the instant of contact. Progressive vertical raising of the load then causes it to reach an inclined position, as indicated by the phantom showing at 48', somewhat greater than the inclination of the conveyor track A. Retraction of the car 24 to a longitudinal position for delivering the load to conveyor A will then bring the load to a position somewhat above the inclined surface 13 of the conveyor A. Lowering actuation of the bell crank members 30 and 36 then causes the load to be lowered into the conveyor A, with the inclination of the load engaging surface 47 of the load beam 23 reaching an inclination equal to that of the conveyor A at the instant of delivery engagement between the load 10 and the load engaging surface 13 of the conveyor A.

Movement of the transfer car 24 along the tracks 26, 27, as best shown in Figs. 4 and 5, is accomplished by the movement of longitudinally reciprocating I-beams 50 pinned at 51 to laterally spaced members 52 on the rear end of the car 24. Each of the I-beam members 50 is provided with a rack 53 rigidly attached to its upper surface which is engaged by a pinion 54 driven by a common drive shaft 55 through a gear reducer 56 and electric motor 57. The lower surface 58 of each beam 50 is supported by and travels along a roller 60 journaled at 61 on a stationary framework 62 and is further supported at its rear end by a wheel assembly 63 connected to the lower surface 58 and adapted to travel along tracks 64 mounted on the rigid framework 62.

In order to provide a stabilizing action for the coiled steel rolls during transfer, a pair of stabilizing arms 65 are provided, being pivotally journaled at 66 on the laterally separated forward ends of the intermediate platform 28 and being adapted to be actuated by air cylinders 67 acting on arm extensions 68 so as to bring each coil engaging member 69 pivotally connected at 70 to the forward end of an arm 65 either into or out of engagement with the steel coils 10.

Synchronized actuation of the two stabilizing arms 65 is accomplished by an interengaging equalizing mechanism, including bevel gears 71, adapted to rotate with the arm 65, engaging bevel gears 72 keyed to rearwardly extending shafts 73 adapted to drive sprocket members 74 and an equalizing chain 75 extending between the respective sprockets 74. Such chain passes over guide pulleys 76 in a manner adapted to clear the load beam 47. Since the stabilizer arms 65 are required to move in opposite directions, the bevel gears 72 which drive the respective shafts 73 are adapted to take their drive from opposite sides of the bevel gears 71.

The operation of the transfer mechanism through a typical cycle is as follows:

Starting from a position shown by a solid line in Figs. 1 and 2, wherein the car 24 is fully retracted, the intermediate platform 28 and load beam 23 are in their lowermost positions and the conveyor B is stopped, with its truck 14 and load 10 in aligned position with the conveyor A, also stopped, the motor 57 is started, driving through the gear reducing unit 56, shaft 55, pinions 54 and racks 53 moving the wheel supported transfer car 24 along tracks 26 and 27 to a forward position indicated by the phantom showing 77 of the forward wheels 25. In such position the load beam 23 will extend between the tail sprockets 12 and between the spaced beam members 15 of the conveyor B truck beneath the coil steel load 10 which is centered on the truck members 15. When the transfer mechanism C has reached such forward position, motor 57 is stopped and the motor 43 started, actuating the bell crank members 30 and 36 to raise the intermediate platform 28, together with the load beam 23, the engaging surface 47 of which reaches a horizontal position at the moment of engaging contact with the load 10. At this moment air cylinders 67 are actuated to bring the stabilizing arms 65 into lateral engagement with the load 10, whereupon continued actuation of the bell crank members 30 and 36 will raise the load 10 to a progressively inclined position with the ultimate inclination shown by the phantom view of the load 48 and load beam 48'. The motor 57 now drives in a reverse direction to return the lower platform 24 to its delivery position as shown in Fig. 1, whereupon the motor 43 is again started to actuate the bell crank members 30 and 36 in a lowering direction until the intermediate platform 28 and load beam 23 reach the delivery position with the load engaging surface 47 of the load beam 23 in parallel alignment with the upper surface 13 of the conveyor chain A. At or just prior to this moment the air cylinders 67 are actuated to move the stabilizing arms 65 to a disengaging position, and the motor 43 thereupon continues to lower the platform 28 and load beam 23 to its lowermost position as shown in Fig. 1, thus completing a single transfer operation.

It will be seen that both conveyor B and conveyor A will run intermittently and that each remains stationary during a transfer operation. The synchronized controls for driving these conveyors, as well as suitable controls for the motors 57, 43 and air cylinders 67 lie outside of the scope of the present invention and are, therefore, not disclosed in the present specification.

It will be understood that transfer in a reverse direction from conveyor A to conveyor B might readily be effected by reversing the direction of travel of conveyor A and the cycle of movement of the transfer mechanism C.

It will also be understood that, having once disclosed a satisfactory embodiment for accomplishing transfer between horizontal and inclined right-angle conveyors, various alternative specific components might be substituted for those disclosed herein without departing from the scope of invention as defined in the following claims.

I claim:

1. A transfer mechanism for moving rigid loads between right-angle conveyors, one of which is a double-chain type of conveyor and the other of which has longitudinally spaced load supporting members, characterized by a load engaging member located between the chains at the end of said double-chain conveyor, mechanism for raising and lowering said load engaging member above and below the load engaging surface of said chain, and mechanism for moving said load engaging member longitudinally to a position between said lonitudinally spaced members, said mechanism for raising and lowering said load engaging member being also adapted to raise and lower said load engaging member above and below the load engaging surface of said longitudinally spaced members, said conveyors traveling in planes having an inclination to each other and said mechanism for raising and lowering said load engaging member being adapted to impart a changing inclination to such member during its travel between load engaging and disengaging positions.

2. A transfer mechanism for moving rigid loads between right-angle conveyors, one of which is a double-chain type of conveyor and the other of which has longitudinally spaced load supporting members, characterized by a load enaging member located between the chains at the end of said double-chain conveyor, mechanism for raising and lowering said load engaging member above and below the load engaging surface of said chain, and mechanism for moving said load engaging member longitudinally to a position between said longitudinally spaced members, said mechanism for raising and lowering said load engaging member being also adapted to raise and lower said load engaging member above and below the load engaging surface of said longitudinally spaced members, said conveyors traveling in planes having an inclination to each other and said mechanism for raising and lowering said load engaging member including unequal bell crank members adapted to impart a changing inclination to such member during its vertical travel between load engaging and disengaging position.

3. A transfer mechanism for moving rigid loads to or from a double-chain conveyor, characterized by a load engaging member adapted to extend between the chains at the end of said conveyor, a pair of laterally spaced end sprockets for said chains, a fixed supporting structure for said sprockets, a platform for mounting said load engaging member having extremities adapted to extend on the outside of said sprockets and their supporting structure while said load engaging member extends between said sprockets, stabilizing members pivotally mounted on said extremities of said platform, and mechanism for pivotally moving said stabilizing arms into and out of engagement with a load supported on said load engaging member.

4. A transfer mechanism for moving rigid loads to or from the end of a double-chain type conveyor, the carrying surface of which is inclined to the floor level, characterized by a load-engaging member adapted to extend between said chains at the end of said conveyor, a transfer car adapted to travel along the floor in a longitudinal direction relative to said conveyor, and a platform rigidly associated with said load-engaging member, mechanism on said car for raising and lowering said platform and for simultaneously imparting a change in the inclination of said load-engaging member in a manner adapted to provide said load-engaging member with an inclination corresponding to that of said conveyor at the moment of transfer.

5. A transfer mechanism for moving rigid loads to or from the end of a double-chain type conveyor, the carrying surface of which is inclined to the floor level, characterized by a load-engaging member adapted to extend between said chains at the end of said conveyor, a transfer car adapted to travel along the floor in a longitudinal direction relative to said conveyor, a platform rigidly associated with said load-engaging member, unequal bell-crank members for raising and lowering said platform relative to said car and for simultaneously imparting a change in the inclination of said load-engaging member in a manner adapted to provide said load-engaging member with an inclination corresponding to that of said conveyor at the moment of transfer.

6. A transfer mechanism for moving rigid loads between right-angle conveyors traveling in planes inclined to each other, one of said conveyors having longitudinally spaced load-supporting members and the other of said conveyors having laterally spaced load-supporting members, characterized by a load-engaging member of said transfer mechanism adapted to move longitudinally between the load-supporting members of each of said conveyors, mechanism for raising and lowering said load-engaging member above and below the load-supporting surfaces of the respective conveyors, and mechanism for imparting a change in inclination to said load-engaging transfer member during its travel between pick-up and delivery positions corresponding to the difference in inclination between the planes of travel of the respective conveyors.

7. A transfer mechanism for moving rigid loads between right-angle conveyors, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor and mechanism for raising and lowering said load-engaging member above and below the load-supporting surfaces of the respective conveyors in a manner adapted to effect a transfer therebetween, said transfer mechanism including a car adapted to travel longitudinally between said conveyors and a platform adapted to be carried by and raised and lowered relative to said car, said platform being rigidly associated with said load-engaging member of said transfer mechanism.

8. A transfer mechanism for moving rigid loads between right-angle conveyors traveling in planes inclined to each other, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor, and mechanism for raising and lowering said load-engaging member above and below the load-supporting surfaces of the respective conveyors and simultaneously imparting a changing inclination to said load-engaging member corresponding to the inclination of said planes in a manner adapted to effect a flush surface contact transfer therebetween.

9. A transfer mechanism for moving rigid loads between right-angle conveyors traveling in planes inclined to each other, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor, and mechanism for raising and lowering said load-engaging member above and below the load-supporting surfaces of the respective conveyors and simultaneously imparting a changing inclination to said load-engaging member corresponding to the inclination of said planes in a manner adapted to effect a flush-surface contact transfer therebetween, said transfer mechanism including a car adapted to travel longitudinally between said conveyors and a platform adapted to be carried by and raised and lowered relative to said car, said platform being rigidly associated with said load-engaging member of said transfer mechanism, and mechanism on said platform adapted to engage and stabilize a load during transfer movement.

10. A transfer mechanism for moving rigid loads between right-angle conveyors traveling in planes inclined to each other, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor, and mechanism for raising and lowering said load-engaging member above and below the load-supporting surfaces of the respective conveyors and simultaneously imparting a changing inclination to said load-engaging member corresponding to the inclination of said planes in a manner adapted to effect a flush-surface contact transfer therebetween, said transfer mechanism including a car adapted to travel longitudinally between said conveyors and a platform adapted to be carried by and raised and lowered relative to said car, said platform being rigidly associated with said load-engaging member of said transfer mechanism, and mechanism on said platform adapted to engage and stabilize a load during transfer movement, said stabilizing mechanism and the portions of said platform supporting the same being positioned outside of said laterally spaced load-supporting members of said other conveyor.

11. A transfer mechanism for moving rigid loads between right-angle conveyors traveling in planes inclined to each other, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor, and mechanism for raising and lowering said load-engaging member above and below the load-supporting surfaces of the respective conveyors and simultaneously imparting a changing inclination to said load-engaging member corresponding to the inclination of said planes in a manner adapted to effect a flush-surface contact transfer therebetween, said transfer mechanism including a car adapted to travel longitudinally between said conveyors and a platform adapted to be carried by and raised and lowered relative to said car, said platform being rigidly associated with said load-engaging member of said transfer mechanism, and mechanism on said platform adapted to engage and stabilize a load during transfer movement, said stabilizing mechanism and the portions of said platform supporting the same being positioned outside of said laterally spaced load-supporting members of said other conveyor, unequal bell-crank members being mounted on said car for raising and lowering said platform with said changing inclination.

12. A transfer mechanism for moving rigid loads between right-angle conveyors traveling in planes inclined to each other, one of said conveyors extending past an end of the other of said conveyors, said one conveyor having longitudinally spaced load-supporting members adapted to be bridged by a single load and said other conveyor having laterally spaced load-supporting members adapted to be bridged by a single load, said transfer mechanism being characterized by a load-engaging member adapted to be moved longitudinally in the direction of said other conveyor and to extend between said load-supporting members of each conveyor, and mechanism for raising and lowering said load-engaging member above and below the load-supporting surfaces of the respective conveyors and simultaneously imparting a changing inclination to said load-engaging member corresponding to the inclination of said planes in a manner adapted to effect a flush-surface contact transfer therebetween, said transfer mechanism including a car adapted to travel longitudinally between said conveyors and a platform adapted to be carried by and raised and lowered relative to said car, said platform being rigidly associated with said load-engaging member of said transfer mechanism, and mechanism on said platform adapted to engage and stabilize a load during transfer movement, said stabilizing mechanism and the portions of said platform supporting the same being positioned outside of said laterally spaced load-supporting members of said other conveyor, unequal bell-crank members being mounted on said car for raising and lowering said platform with said changing inclination, and a connecting rod between said unequal bell-crank members for effecting simultaneous actuation from a single source of power.

References Cited in the file of this patent

UNITED STATES PATENTS

| 2,024,949 | Schefe | Dec. 17, 1935 |
| 2,092,540 | Talbot | Sept. 7, 1937 |
| 2,361,222 | McBride | Oct. 24, 1944 |

FOREIGN PATENTS

| 585,778 | Great Britain | Feb. 24, 1947 |

OTHER REFERENCES

Ser. No. 368,952, Cramer (A. P. C.), published May 18, 1943.